United States Patent [19]
Weinberger et al.

[11] Patent Number: 5,519,769
[45] Date of Patent: May 21, 1996

[54] METHOD AND SYSTEM FOR UPDATING A CALL RATING DATABASE

[75] Inventors: Gerald J. Weinberger, Smithtown; Roger C. Lee, Wading River, both of N.Y.

[73] Assignee: Rates Technology Inc., Smithtown, N.Y.

[21] Appl. No.: 223,082

[22] Filed: Apr. 4, 1994

[51] Int. Cl.⁶ .................................................. H04M 15/00
[52] U.S. Cl. .................... 379/112; 379/111; 379/113; 379/114; 379/115; 379/130; 379/131; 379/132
[58] Field of Search ............................ 379/111, 112, 379/113, 114, 115, 116, 130, 131, 132, 88, 104, 105, 106

[56] References Cited

U.S. PATENT DOCUMENTS

| | | | |
|---|---|---|---|
| 4,104,486 | 8/1978 | Martin | 379/106 |
| 4,122,308 | 10/1978 | Weinberger | 379/114 |
| 4,136,262 | 1/1979 | Clark, Jr. | 179/6.3 |
| 4,198,545 | 4/1980 | Haist et al. | 179/6.3 |
| 4,209,668 | 6/1980 | Weinberger et al. | 179/90 |
| 4,226,360 | 10/1980 | Simjian | 379/106 |
| 4,410,765 | 10/1983 | Hestad | 379/112 |
| 4,439,636 | 3/1984 | Newkirk | 379/91 |
| 4,521,857 | 6/1985 | Reynolds | 379/88 |
| 4,585,904 | 4/1986 | Mincone | 379/131 |
| 4,656,657 | 4/1987 | Hunsicker | 379/131 |
| 4,751,728 | 6/1988 | Treat | 379/114 |
| 4,813,065 | 3/1989 | Segala | 379/116 |
| 4,888,822 | 12/1989 | Weinberger et al. | 379/130 |
| 4,935,956 | 6/1990 | Hellwarth | 379/112 |
| 5,003,584 | 3/1991 | Benyacar | 379/135 |
| 5,187,710 | 2/1993 | Chau | 379/114 |
| 5,319,701 | 6/1994 | Hird et al. | 379/132 |

*Primary Examiner*—Stephen Chin
*Assistant Examiner*—Vijay Shankar
*Attorney, Agent, or Firm*—James & Franklin; Harold James; Robert L. Epstein

[57] ABSTRACT

A method and system for updating a database stores billing rate parameters for call rating devices associated with a calling station. The calling station calls at a predetermined date and time a rate provider, which includes billing rate parameters for a plurality of calling stations. The call rating device transmits over the telephone network to the rate provider the phone number of the calling station, and the date and time of the last updated database. The rate provider verifies that the billing rate parameters of the calling station should be updated, then transmits back over the telephone network to the calling station the updated database. The rate provider also sends data as to the new date and time for the call rating device to place a call to the rate provider.

48 Claims, 7 Drawing Sheets

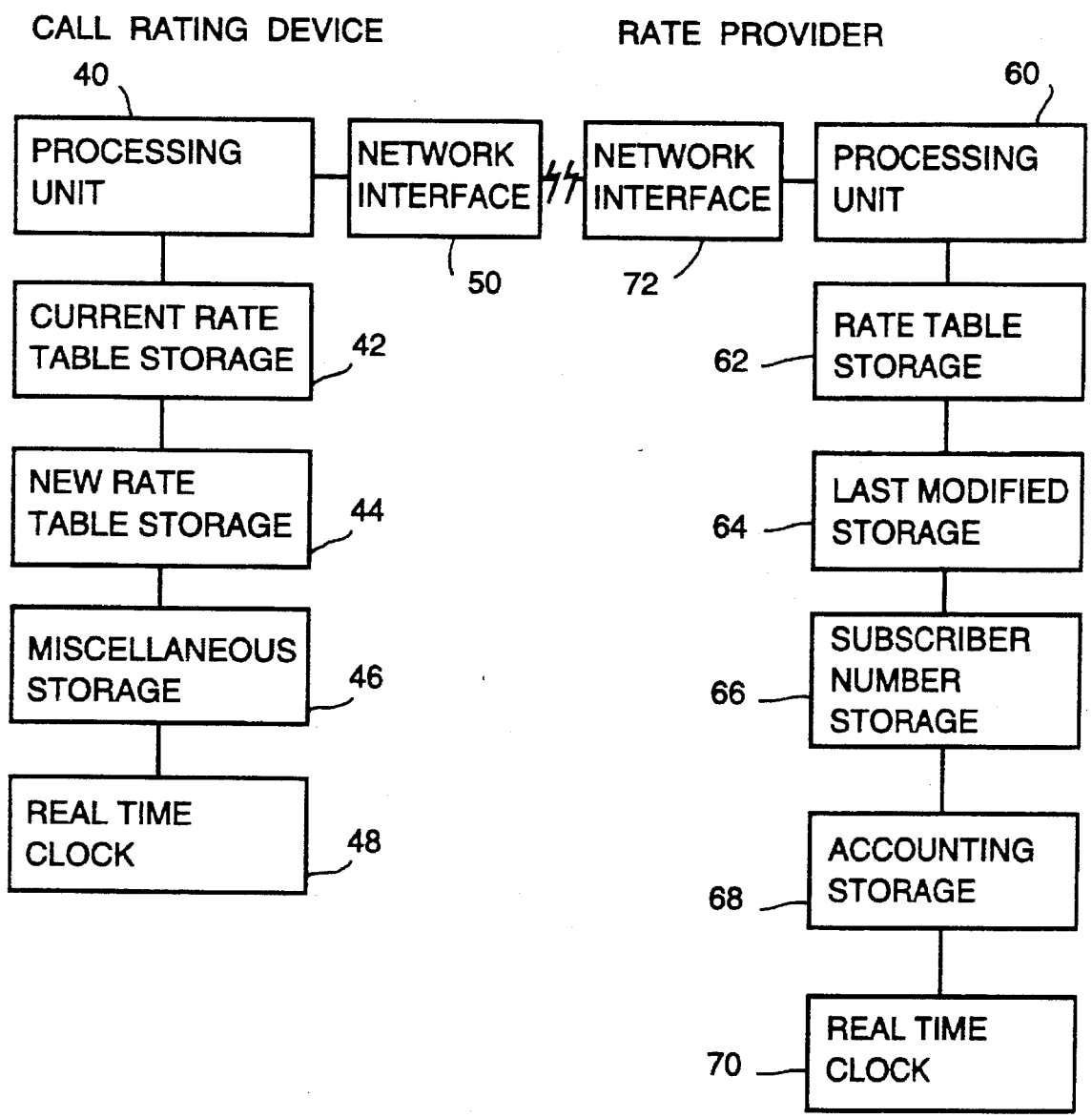

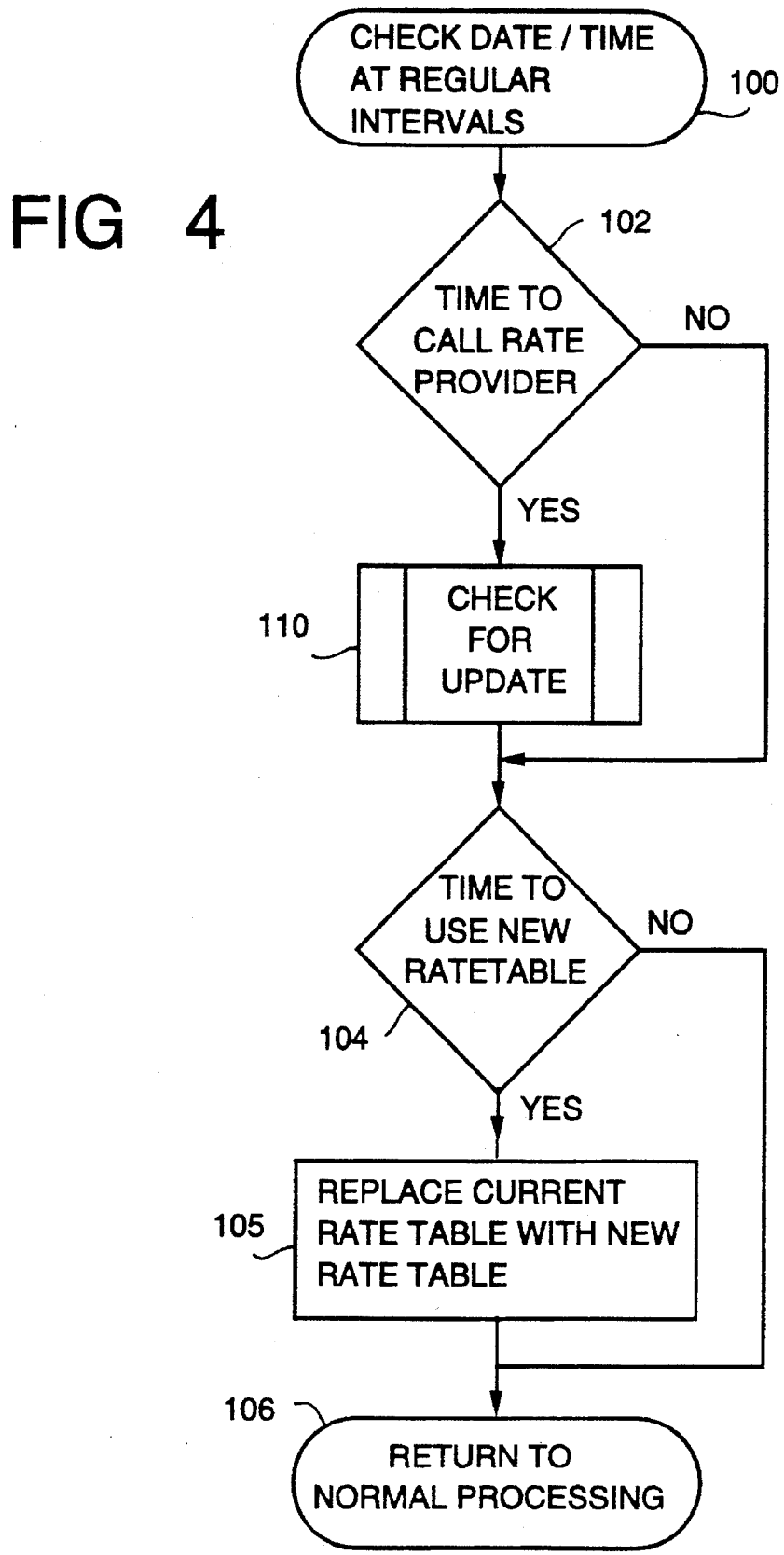

5,519,769

METHOD AND SYSTEM FOR UPDATING A CALL RATING DATABASE

FIELD OF THE INVENTION

This invention leads to a method and system for updating a database that stores billing rate parameters for a call rating device used in determining the cost of a telephone call.

BACKGROUND OF THE INVENTION

Competition among numerous local and long distance telephone carriers often results in many cost changes associated with placing both local and long distance telephone calls. Anticipated telephone services will probably include debit card calling from pay phones, as well sophisticated computer network hookup to the telephone network via pay telephones or other calling stations. In such circumstances, it is essential that any database storing a rate table used to cost such calls be accurate and current. The rates must be synchronized to current charges to maintain proper debiting of debit cards and cost charges on databases of cost accounting systems.

In copending patent application Ser. No. 08/210670, entitled "Least Cost Routing Device For Separate Connection Into Phone Line", filed Mar. 18, 1994, a device interconnects within the phone line of a first phone station such as in a residential household, and routes telephone calls along a least cost route originating from that telephone to a destination telephone via the telephone network. A database within the device stores billing rate parameters for determining various communication paths to different carriers based on parameters such as time and date of the call. A home purchaser of such device and service relies on the database to ensure that the least cost route is chosen. The database must be kept current, and updated with the latest rate changes, or the device's function does not consumer perform to expectations.

SUMMARY OF THE INVENTION

The advantages and features of the present invention now allows the database that stores billing rate parameters in a rate table for call rating devices to be updated. The call rating device is connected at a predetermined time and date via a data transfer line to a rate provider having billing rate parameters for a plurality of calling stations. Indicia identifying the call rating device and the date and time of the last update of the billing rate parameters is transmitted over the data transfer line to the rate provider. The rate provider verifies that the billing rate parameters should be updated, and it transmits to the call rating device the updated billing rate parameters when the rate provider determines that an update is required.

In one aspect of the invention, the data transfer line is a part of the telephone network. The call rating device is associated with a calling station and connects to the network via a modem. The rate provider includes a database stored in a personal computer, minicomputer or other similar device, which could connect to the network via a modem.

In one aspect of the invention, the data transfer between the call rating device and rate provider is terminated when the call rating device is used. Transfer of information should not interfere with the normal usage of the call rating device. This is advantageous such as when the call rating device is incorporated within a pay telephone. If a customer desires to use the telephone, any pending rate transfer is terminated.

In another aspect of the invention, the call rating device stores the updated billing parameters in a separate database. When the telephone network switches to the new rates, the call rating device automatically substitutes the updated billing rate schedule into the old database. Typically, the rate provider sends the time and date when any call rating devices which are part of a rating network should call the rate provider to solicit rate information. The rate provider then sends a new billing rate schedule to respective call rating devices at different times. This is advantageous when many call rating devices are subscribers to the rate network. The rate provider will not be overloaded at one time with numerous "request for update" calls. During updating, the rate provider sends new times and dates when each respective call rating device should call for an updated database.

DESCRIPTION OF THE DRAWINGS

The foregoing advantages and features of the present invention will be appreciated more fully from the following description with reference to the accompanying drawings in which:

FIG. 2 is a block diagram of the overall components of the call rating device and rate provider.

FIG. 4 is a high level flow chart showing the basic processing for using and replacing a current rate table with a new rate table.

DETAILED DESCRIPTION OF THE INVENTION

Figure 1:
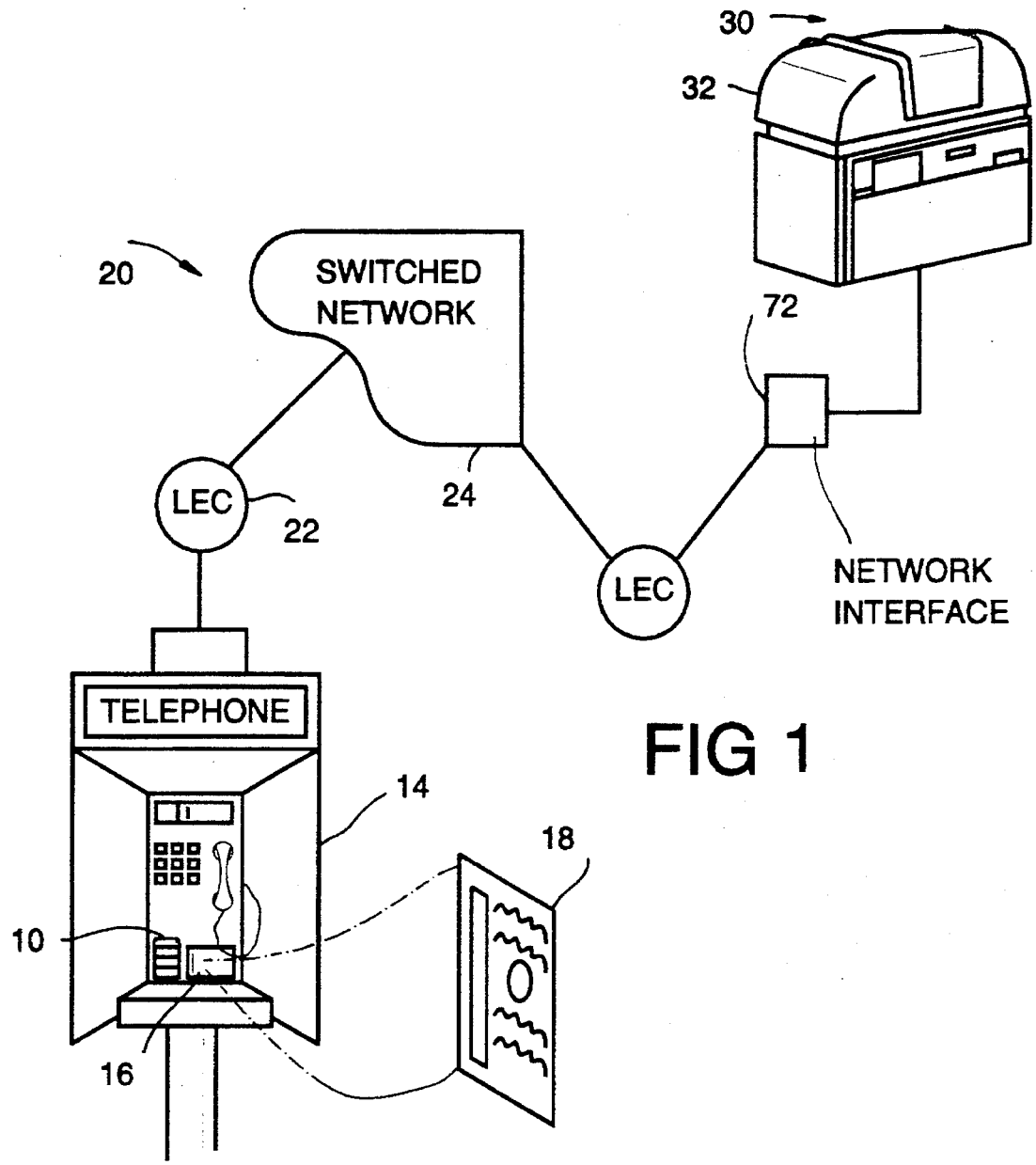
FIG. 1 is an environmental view showing the call rating device incorporated within a debit telephone connected via the telephone network to a rate provider in the form of a minicomputer.

Referring now to FIG. 1, there is illustrated the call rating device 10 of the present invention which is incorporated within a pay telephone 14, which in the illustrated example is a debit telephone. Although the description proceeds in reference to the illustrated debit telephone 14, it is understood that the call rating device 10 can be incorporated with the least cost rating device disclosed in U.S. patent application Ser. No. 08/210,670, entitled "Least Cost Routing Device For Separate Connection Into Phone Line, "filed", Mar. 18, 1994, the disclosure which is hereby incorporated by reference, and it can be incorporated with other telephones or personal computers connected to a LAN network.

In the illustrated embodiment, the debit telephone 14 includes a card slot 16 where a debit card 18 is inserted. The debit 18 card typically includes a dollar amount which will be debited each minute as the phone is used. The phone includes an internal modem connection to allow data transfer along the phone network 20. The phone network typically includes a central office 22 and a switched network 24.

In the illustrated example, the rate provider 30 is a large capacity computer with a hard drive 32 for storing the rate information for various calling stations such as the debit telephone 14. Although a minicomputer is illustrated as a rate provider, in smaller rate networks when not many subscribers use the system of the invention, a powerful personal computer will suffice.

In accordance with the present invention, the rate provider services numerous other subscribers to the updating service, and could include other debit telephones, household/residential telephones using plug devices as disclosed in the copending '670 application, or personal computers in cost management systems, LAN systems and other similar uses. The users form a rate network. Each user is a subscriber to the overall rate network. The billing rate parameters could include the rates for local and long distance calls, and the rates of various carriers in some instances.

As shown in FIG. 2, the call rating device 10 would typically include a processing unit 40 such as a standard microprocessor unit. The current rate table storage 42 used for storing the billing rate parameters forming the rate table could be a static ram or any nonvolatile storage such as currently used with IBM Compatible PCs. An EEPROM has been found advantageous also. The new rate table storage 44 can be identical to the current rate table storage 42, except that the new rate table storage will be substituted for the current rate table when an update is required. Miscellaneous storage 46 can also be static ram or other similar storage devices and will store such items as the phone number associated with the call rating device, the date and time in which to call the rate provider, as well as other miscellaneous information.

The amount of required storage capacity could be small, typically on the order of about 32K byte. Naturally, the amount of storage varies depending on the type of telephone or other device which is associated with the call rating device, and the end use of the device. The real time clock 48 maintains time over the processing unit and the movement of data between the various storage devices 42, 44 and 46. In the illustrated embodiment, the network interface for the call rating device is a modem which interfaces with the phone network. In some instances, however, the network interface could be associated with T1 lines and other communication paths.

The rate provider also includes a processing unit 60. However, because of the larger database and processing demands placed upon the rate provider, the processing unit 60 typically is a larger unit such as associated with a minicomputer or high powered PC compatible computer. The rate table storage 62 can be a hard disc or any other type of large capacity data storage to keep track of all call rating device databases which subscribe to the rate network. The last modified storage 64 is a storage area where every modification to a database is stored to maintain a record of rate table modifications for each call rating device in the rate network.

The subscriber number storage 66 stores each telephone number associated with a call rating device, such as the telephone number associated with the debit telephone station illustrated in FIG. 1. The transaction storage 68 maintains a record of which calling station has connected to the rate provider, and in conjunction with the processing unit 60, verifies all transactions, tracks telephone numbers, and maintains records and information such as when respective call rating devices are scheduled to call the rate provider. A real time clock 70 properly synchronizes timing of the processing unit 60. The rate provider also includes a network interface 72 such as a modem or (T1 lines in some instances) for communicating with the call rating device 10 via the phone network, or perhaps with leased modem or phone lines.

In accordance with the present invention, the call rating device may also communicate through a local area network, especially when the call rating device and rate provider are associated with personal computers. Two computers could be connected via a data transfer line and the call rating device updated. The personal computer associated with the call rating device could be used to input data to a private branch exchange or other similar exchange. Additionally, the call rating device could be associated with a call accounting system used with a LAN network.

In the illustrated aspect of the invention, the call rating device is associated with a calling station, the debit phone 14 of FIG. 1, and connected by network interface 52 to the telephone network. The calling station at the appropriate predetermined time set by the rate provider calls a 900 number and connects to the rate provider. The calling station that calls the 900 number will automatically be billed, and the rate provider will obtain the funds back from the telephone company. Thus, the system can provide an automatic billing system, minimizing the amount of expensive and complex files that the rate provider would have to generate, such as those normally associated with "toll-free" 800 numbers.

Figure 3:
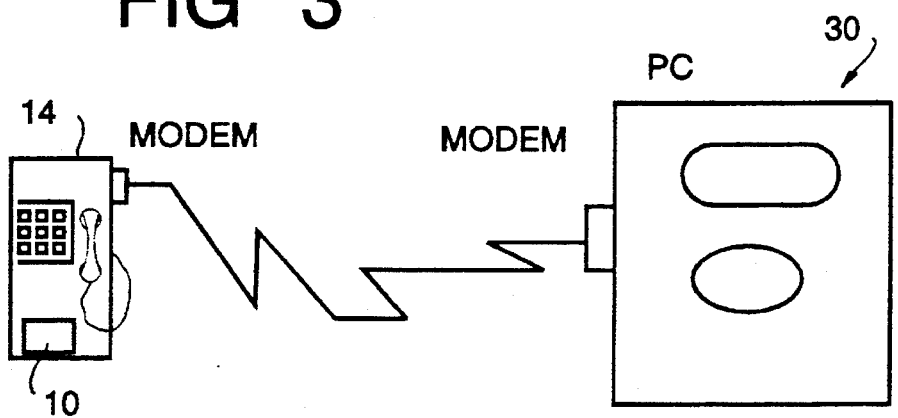
FIG. 3 is a block diagram showing basic components of a pay telephone and a call rating device in the form of a personal computer where modems connect to the telephone network.
Figure 5:
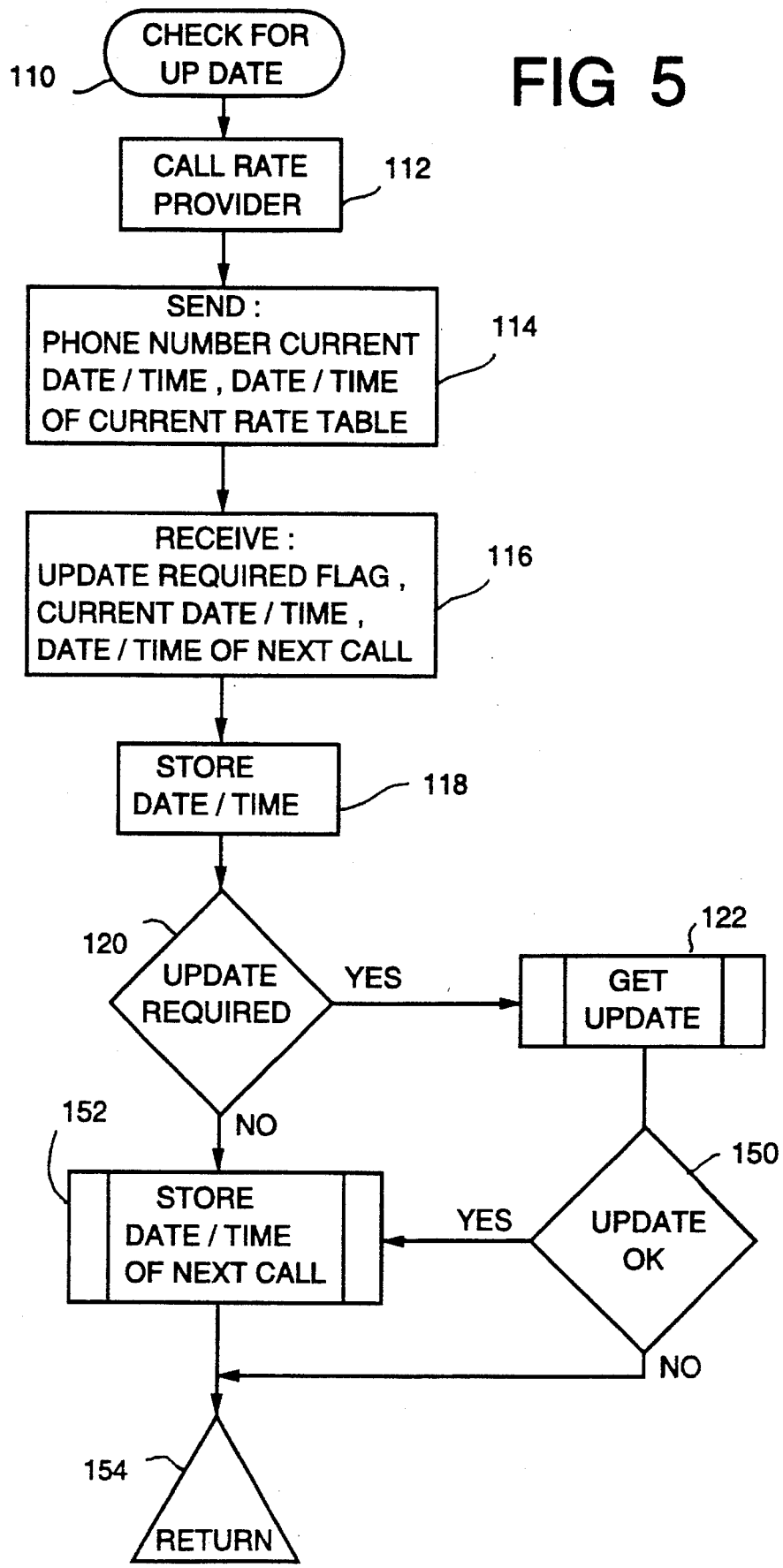
FIG. 5 is a flowchart showing the subroutine where the call rating device is checked for updates.
Figure 6:
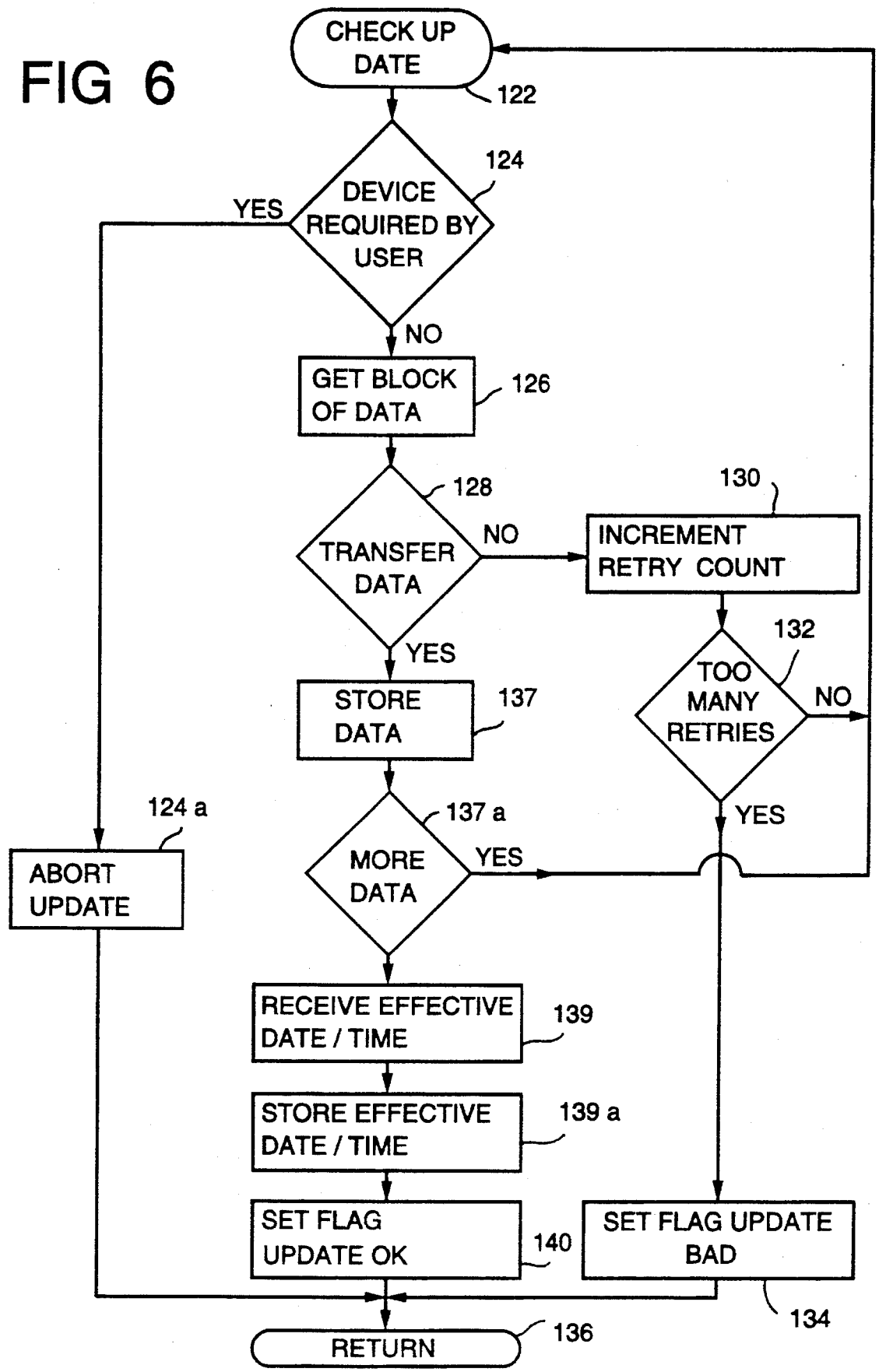
FIG. 6 is a flowchart showing the subroutine where the call rating device obtains the information from the rate provider.

FIG. 3 illustrates another block diagram where the debit phone is connected to a personal computer using modems for network interfaces.

Referring now to FIGS. 4–8, there are illustrated flowcharts showing operation of the call rating device and the rate provider. In the description that follows, the call rating device is described with reference to the debit phone as illustrated in FIG. 1. The rate provider is typically associated with a computer such as illustrated in FIG. 1. The references for each block will be described starting from the numeral one hundred (100) and sequentially following with mainly even numbers.

As shown in FIG. 4, in block 100, the call rating device 10 at some frequent interval of time checks the date and time which are maintained by the real time clock 48. Based on the data stored in miscellaneous storage 46, the call rating device 10 in block 100 and 102 determines whether it is time to call the rate provider 30 to determine if an updated billing schedule is required. The frequency of calls made in block 100 and 102 can vary depending on the location of the call rating device and the type of associated equipment. If it is not time to call the rate provider, then the processor 40 checks to see whether it is time to use any new rate table (block 104) which may be stored in the new rate table storage 44. The rate table is replaced (block 105) if changes are required. If changes to the new rate table (block 104) are not required, the call rating device returns to normal processing (block 106).

If it is time to call the rate provider, then the subroutine, "Check For Update " is followed (block 110), and the rate provider is called (block 120). Typically the modem is initialized and information is sent which includes: (1) the phone number associated with the calling station of the call rating device; (2) the current date and time; and (3) the date and time when the current rate table was substituted for a previous autorate table or first used (block 114).

The rate provider 30 receives the information sent by the call rating device 10. An update flag is generated and signals the call rating device processor whether an update is required. The rate provider has the intelligent capability to determine when each call rating device associated with a calling station should make any calls so that the calls can be staggered. This is essential in a large network to prevent overloading the rate provider.

The block of information includes the current date and time and the date and time when the calling rating device should make the next call to the rate provider. In block 118, the date and time of the next call is stored and the information received from the rate provider is checked to determine if the database stored in the call rating device should be updated. If the database should be updated, the subroutine "Get Update" is followed in block 122.

In block 124 a determination is first made whether a device is required by a user before an update is requested or during transmission of any information between the call rating device and rate provider. For example, in the debit phone of FIG. 1, if the customer requires use of the debit phone, and any data is being downloaded, then any data transfer is terminated so that the customer may use the phone (block 124a). If the call rating device is associated with a computer which must be used, the data transfer is terminated. In block 126 the data is received from the rate provider typically as a block of data or packet which can be transmitted over the telephone network. Typically, some protocol such as X modem, Y modem, Z modem could be used to insure accurate transfer.

In block 128, if the transfer of information is not adequate, then a retry count is incremented (block 130), and data transfer is retried once again. If there have been too many retries (block 132) then a flag initiating termination of retries is established (block 134) and return is made to normal processing (block 136). The number of retries in block 132 can be set to a predetermined amount such as three or four retries. If the number of retries has not reached the maximum, the "Get Update" routine is initiated.

In block 137, the transferred data is stored. If more data is required (block 137a), the "Get Update" subroutine is initiated. If more data is not required, the effective date and time is received (block 139) and stored (block 139a). The processor initiates an "Update Okay" flag (block 140) and return is made to the normal processing routine. If the update was not proper (FIG. 5, block 150), then the date and time of the next call is not changed. The call rating device will keep calling at the proper intervals of time until it receives an update. If the update is okay, then the date and time of the next call is stored (block 152). After the date and time is stored in, normal processing occurs (block 154).

Figure 7:
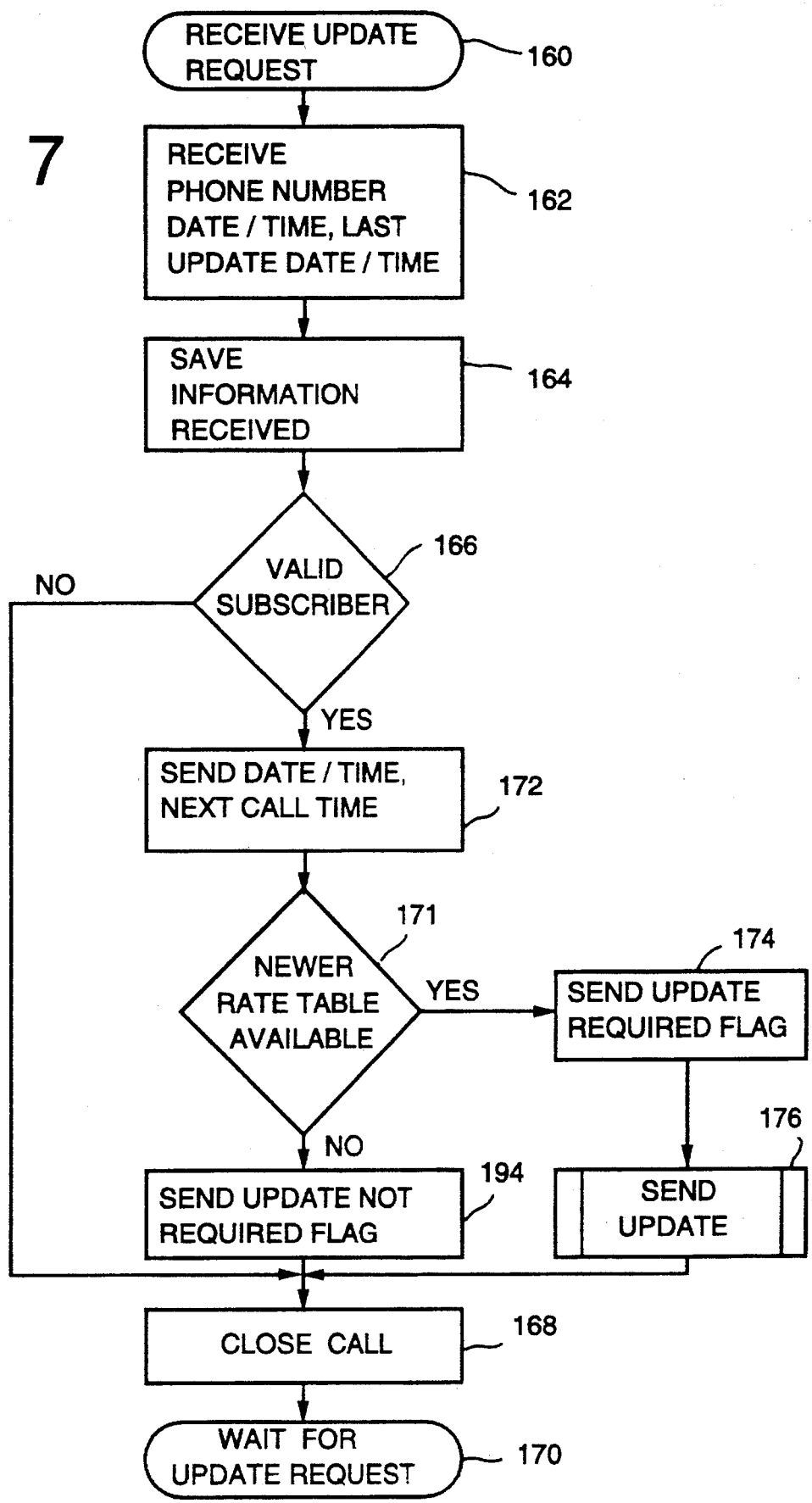
FIG. 7 is a flowchart showing the routine where the rate provider receives an updated request from the call rating device.
Figure 8:
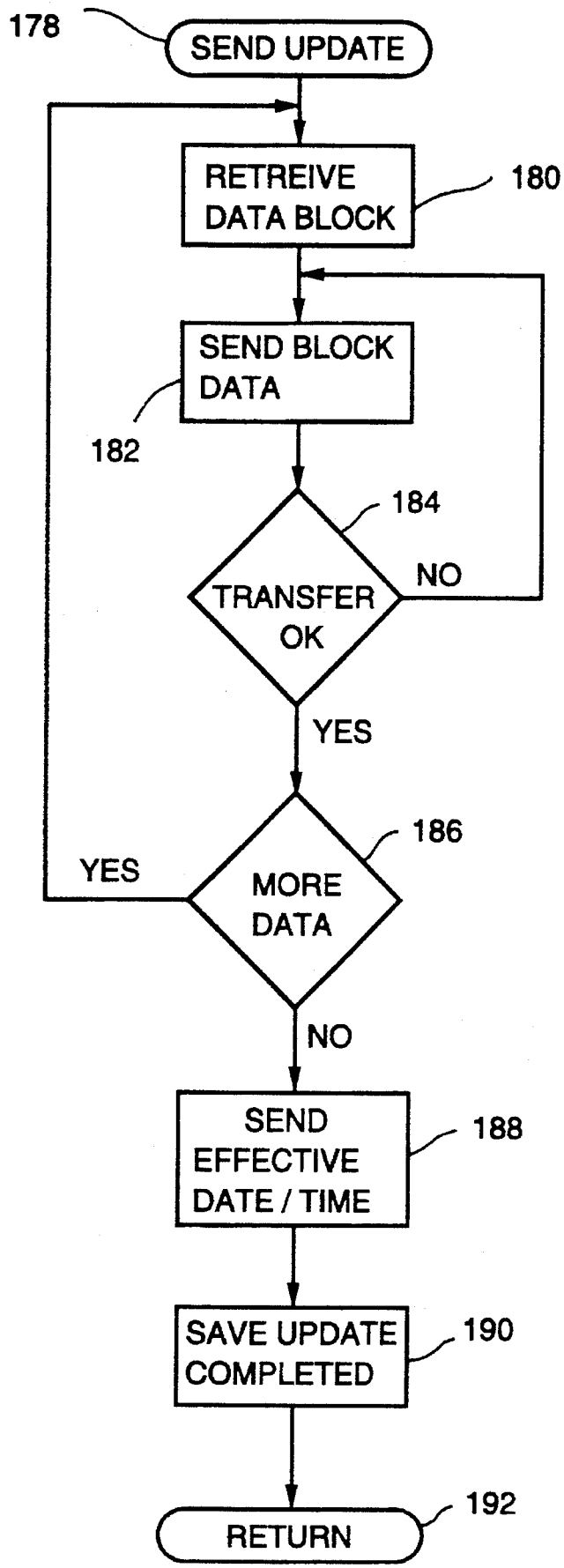
FIG. 8 is a flowchart showing the routine where the rate provider sends an update to the call rating device.

Referring now to FIGS. 7 and 8, the call processing routines for the rate provider 30 are illustrated. As shown in FIG. 7, the rate provider receives the update request from the call rating device (block 160). It receives 1) the calling station's phone number; 2) the date and time of the last update; and 3) the current date and time (block 162). The rate provider saves that information (block 164) and then determines if the calling station with associated call rating device is a valid subscriber to the rate network (block 166). If the number is not a valid subscriber, the call is terminated (block 168) and the rate provider then waits for the next update request from another calling station (block 170).

If the number received is a number for a valid subscriber (block 166), then the rate provider sends the date and time of the next call to be made by that particular calling station (block 172). If a newer rate table is available, (block 173), then an update flag is initiated by the processing unit of the rate provider (block 174) and the update is sent, illustrated in the "Send Update" subroutine of FIG. 8.

As shown in FIG. 8, the block of data is retrieved such as from the hard disk (block 180) and the block of data is sent over the telephone network (block 182). If the data transfer is not proper (block 184), such as if a pay phone has terminated data transfer, then the data block is sent again (block 182). This loop may repeat for several instances.

If the data transfer is proper, then verification is made whether more data should be sent, (block 186). If more data should be sent, then further data is retrieved and transferred (block 180). If more data does not need to be transmitted, then the effective data and time is transmitted (block 188) and the update information is saved (block 190) and stored in the accounting or transactional database 68. Processing then returns to normal routine (block 192).

If a newer rate table is not available (block 174), then an "Update Not Required" flag is initiated (block 194) and the call is terminated. The rate provider then waits for the update request (block 170) from another call rating device.

The method and system of the present invention is advantageous because the growing telephone network has seen the outgrowth of various options such as debit telephones and least cost routing devices, which house rate tables that can be updated. Use of the 900 service to call a rate provider will simplify billing procedures as compared to more complex 800 toll free services.

It is to be understood that the above description is only one embodiment of the invention. Numerous other arrangements may be devised by one skilled in the art without departing from the spirit and skill of the invention.

That which is claimed is:

1. A method for updating a database that stores billing rate parameters for a call rating device used for cost determinations for a calling station, comprising the steps of connecting at a predetermined time and date via a data transfer line the call rating device to a rate provider having billing rate parameters for a plurality of calling stations, transmitting over the data transfer line indicia identifying the call rating device and the date and time of the last update of the billing rate parameters, verifying if billing rate parameters should be updated, and transmitting from the rate provider to the call rating device the updated billing rate parameters when the rate provider determines that an update is required.

2. The method according to claim 1 wherein the step of connecting via a data transfer line includes the step of connecting the call rating device to a telephone network via a modem and calling the rate provider.

3. The method according to claim 2 wherein the call rating device comprises a pay telephone.

4. The method according to claim 3 including the step of terminating the transfer of information between the rate provider and the pay telephone when the pay telephone is to be used.

5. The method according to claim 1 including terminating any data transfer between the call rating device and the rate provider when the call rating device is to be used.

6. The method according to claim 1 including storing the updated billing rate parameters in the call rating device after receiving the billing rate parameters, and substituting the updated parameters into the database at a later predetermined time.

7. The method according to claim 1 including the step of reattempting data transfer from the rate provider to the call rating device if the initial rate data was not transferred properly, and terminating the reattempts to transfer data after a predetermined number of attempts to transfer data have been made.

8. The method according to claim 1 including the step or updating the time and date for connecting to the rate provider.

9. The method according to claim 1 including reattempting data transfer when the data has not transferred properly.

10. The method according to claim 1 wherein the connecting step of claim 1 includes the step of calling a 900 number.

11. A method for updating a database that stores billing rate parameters for a call rating device associated with a calling station operatively connected to a telephone network, comprising calling at a predetermined date and time a rate provider having billing rate parameters for a plurality of calling stations so as to connect between the calling station with the associated call rating device and the rate provider, transmitting over the telephone network to the rate provider the phone number of the calling station and the date and time of the last update of the billing rate parameters, verifying if the billing rate parameters should be updated, and transmitting over the telephone network to the calling station the updated billing rate parameters when the rate provider determines that a database update is required.

12. The method according to claim 11 including the step of calling the rate provider at regular intervals of time.

13. The method according to claim 11 including the step of receiving from the rate provider a calling station time schedule for calling the rate provider for updated billing rate information at a predetermined time.

14. The method according to claim 11 wherein the calling station comprises a pay telephone and including the step of terminating the transfer of information between the rate provider and the pay telephone when the pay telephone is to be used.

15. The method according to claim 11 including the step of verifying the accuracy of the transfer of information between the calling station and the rate provider.

16. The method according to claim 11 including the step of reattempting data transfer from the rate provider to the call rating device if the initial data was not transferred properly, and terminating the attempt to transfer data after a predetermined number of attempts to transfer data have been made.

17. The method according to claim 11 including the step of downloading the rate information to the database via a modem.

18. The method according to claim 11 wherein the call rating device comprises a least cost rating device.

19. The method according to claim 11 including storing the updated billing rate parameters in the call rating device after receiving the parameters, and substituting the updated parameters into the database at a later predetermined time.

20. The method according to claim 11 including the step of updating the time and date for connection to the rate provider.

21. The method according to claim 11 including reattempting data transfer when the data has not transferred properly.

22. The method according to claim 11 wherein the connecting step of claim 1 includes the step of calling a 900 number.

23. A method for updating subscriber databases that store billing rate parameters for call rate devices which are associated with respective subscriber calling stations operatively connected to a telephone network, comprising the steps of each subscriber station calling at a scheduled time a rate provider having billing rate parameters for each calling station, wherein the scheduled time for each call is such that the calls from each calling station are substantially spaced apart in time from each other, each station transmitting over the telephone network the respective phone number of its station and the date and time of the last update of the billing rate parameters, verifying in the rate provider that an update is required, and transmitting over the telephone network from the rate provider to the calling station the updated billing rate parameters when an update is required.

24. The method according to claim 23 including the step of calling the rate provider at regular intervals of time.

25. The method according to claim 23 including the step of receiving from the rate provider device a calling station time schedule for calling the rate provider for updated information.

26. The method according to claim 23 wherein the calling station comprises a pay telephone and including the step of terminating the transfer of information between the rate provider device and the pay telephone when the pay telephone is to be used.

27. The method according to claim 23 including the step of verifying the accuracy of the transfer of information between the calling station and the rate provider device.

28. The method according to claim 23 including the step of reattempting to transfer data from the rate provider to the calling station if the initial data was not transferred properly, and terminating the attempt to transfer data after a predetermined number of attempts to transfer data have been made.

29. The method according to claim 23 including the step of downloading the rate information to the database via a modem.

30. The method according to claim 23 including verifying that a calling party is a subscriber.

31. The method according to claim 23 including storing the updated billing rate parameters in the call rating device after receiving the update billing rate parameters, and substituting the updated billing rate parameters into the current database at a later predetermined time.

32. The method according to claim 23 including the step of updating the time and date for connecting to the rate provider.

33. The method according to claim 23 including the step of reattempting data transfer when the data has not transferred properly.

34. The method according to claim 23 wherein the connecting step of claim 24 includes the step of calling a 900 number.

35. A call rating updating system comprising a call rating device, including a database that stores current updated billing rate parameters used for cost determinations for a calling station, a data transfer line operatively connected to the call rating device, means for transmitting over the data transfer line indicia information identifying the call rating device and update information identifying the last update of the billing rate parameters, and a rate provider operatively connected to said data transfer line, said rate provider including
  a) a database having updated billing rate parameters for a plurality of calling stations,
  b) means for receiving the information from the call rating device,
  c) means for verifying if billing rate parameters should be updated, and
  d) means transmitting from the rate provider to the call rating device the updated billing rate parameters when the rate provider determines that an update is required.

36. The system according to claim 35 wherein said data transfer line comprises a switched communication path of a telephone network.

37. The system according to claim 35 wherein the call rating device comprises a pay telephone.

38. The system according to claim 35 including means for terminating the transfer of information between the rate provider and the call rating device when the device is to be used.

39. The system according to claim 35 wherein said call rating device comprises a least cost rating device.

40. The system according to claim 35 including modem means for connecting the call rating device and rate provider to the data transfer line.

41. The system according to claim 35 wherein said call rating device includes means for storing the updated billing rate parameters in the call rating device after receiving the updated billing rate parameters, and means for substituting the updated parameters into the current database at a later predetermined time.

42. The system according to claim 35 wherein the rate provider is connected via a 900 number.

43. A system for updating a database having billing rate parameters for determining the cost of telephone calls originating from a calling station to a destination calling station via a telephone network, comprising a calling station operatively connected to the telephone network, and including database means associated with the calling station for storing billing rate parameters for determining the cost of the phone call, and including means for transmitting over the telephone network information identifying the phone number of the calling station and the date and time of the last update of the billing rate parameters, rate providing means operatively connected to the phone network for storing billing rate parameters for calling stations, said rate providing means including means for receiving said information from the calling station, said rate providing means including:
  a) control means for determining whether the calling party database should be updated, and
  b) means for transmitting updated billing rate parameters to the calling party when an update is required.

44. The system according to claim 43 wherein the call rating device comprises a least cost rating device.

45. The system according to claim 43 wherein said means for transmitting information from the calling station includes a modem.

46. The system according to claim 43 wherein said means for transmitting updated billing rate parameters to the calling station includes a modem.

47. The system according to claim 43 wherein said calling station comprises a pay telephone, and including means for terminating any transfer of information between said pay telephone and said rate providing means when said pay telephone is to be used.

48. The system according to claim 43 wherein the rate provider is connected via a 900 number.

* * * * *

(12) REEXAMINATION CERTIFICATE (4583rd)

United States Patent
Weinberger et al.

(10) Number: US 5,519,769 C1
(45) Certificate Issued: May 28, 2002

(54) METHOD AND SYSTEM FOR UPDATING A CALL RATING DATABASE

(75) Inventors: Gerald J. Weinberger, Smithtown; Roger C. Lee, Wading River, both of NY (US)

(73) Assignee: Rates Technology Inc., Smithtown, NY (US)

Reexamination Request:
No. 90/005,473, Aug. 31, 1999

Reexamination Certificate for:
Patent No.: 5,519,769
Issued: May 21, 1996
Appl. No.: 08/223,082
Filed: Apr. 4, 1994

(51) Int. Cl.[7] ............................................. H04M 15/00
(52) U.S. Cl. ..................... 379/112; 379/111; 379/113; 379/114; 379/115; 379/130; 379/131; 379/132
(58) Field of Search ................................. 379/111, 112, 379/113, 114, 115, 116, 130, 131, 132, 88, 104, 105, 106

(56) References Cited

U.S. PATENT DOCUMENTS

| | | | |
|---|---|---|---|
| 5,161,109 A | 11/1992 | Keating et al. | 364/464.02 |
| 5,212,789 A | 5/1993 | Rago | 395/600 |
| 5,473,630 A | 12/1995 | Penzias et al. | 375/114 |
| 5,515,425 A | 5/1996 | Penzias et al. | 379/114 |
| 5,799,071 A | 8/1998 | Azar et al. | 379/113 |

FOREIGN PATENT DOCUMENTS

| EP | 0 586 157 A2 | 3/1994 | G06F/15/403 |
|---|---|---|---|

OTHER PUBLICATIONS

Communiqué Telecommunications, Inc. (Ontario, California), "Customized Telemiser Selects Low–Cost Routing," *Computerworld,* vol. XVIII, No. 48, Nov. 28, 1983, p. 109 (plus cover page and contents page).

Communiqué Telecommunications, Inc. (Ontario, California), "Least–Cost Router," *Telecommunications,* vol. 18, No. 1, Jan., 1984, p. 92 (plus cover page and contents page).

Communiqué Telecommunications, Inc. (Ontario, California), "How to Make the Least of Your Long Distance Phone Bill," *Communications News,* vol. 21, No. 9, Sep. 1984, p. 171 (plus cover page).

Communiqué Telecommunications, Inc. (Ontario, California), "How to Make the Least of Your Long Distance Phone Bill," *Sports Illustrated,* Oct. 1, 1984, p. 113 (plus cover page).

CALLMISER Trademark File History (Registration No. 1725288; Registration Date Oct. 20, 1992; International Class 9).

*Primary Examiner*—Vijay Shankar

(57) ABSTRACT

A method and system for updating a database stores billing rate parameters for call rating devices associated with a calling station. The calling station calls at a predetermined date and time a rate provider, which includes billing rate parameters for a plurality of calling stations. The call rating device transmits over the telephone network to the rate provider the phone number of the calling station, and the date and time of the last updated database. The rate provider verifies that the billing rate parameters of the calling station should be updated, then transmits back over the telephone network to the calling station the updated database. The rate provider also sends data as to the new date and time for the call rating device to place a call to the rate provider.

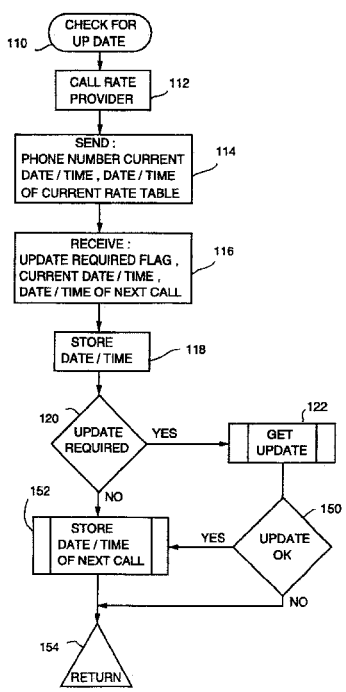

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–48 is confirmed.

New claims 49–53 are added and determined to be patentable.

*49. A method for updating a database that stores billing rate parameters for a call rating device used for cost determinations for a calling station, comprising the steps of*
  *connecting at a predetermined time and date via a data transfer line the call rating device to a rate provider having billing rate parameters for a plurality of calling stations,*
  *transmitting over the data transfer line indicia identifying the call rating device and the date and time of the last update of the billing rate parameters,*
  *verifying if billing rate parameters should be updated based on said transmitted last update indicia, and*
  *transmitting from the rate provider to the call rating device the updated billing rate parameters when the rate provider determines that an update is required.*

*50. A method for updating a database that stores billing rate parameters for a call rating device associated with a calling station operatively connected to a telephone network, comprising*
  *calling at a predetermined date and time a rate provider having billing rate parameters for a plurality of calling stations so as to connect between the calling station with the associated call rating device and the rate provider,*
  *transmitting over the telephone network to the rate provider the phone number of the calling station and the date and time of the last update of the billing rate provider,*
  *verifying if the billing rate parameters should be updated based on said transmitted last update information, and*
  *transmitting over the telephone network to the calling station the updated billing rate parameters when the rate provider determines that a database update is required.*

*51. A method for updating subscriber databases that store billing rate parameters for call rate devices which are associated with respective subscriber calling stations operatively connected to a telephone network, comprising the steps of*
  *each subscriber station calling at a scheduled time a rate provider having billing rate parameters for each calling station, wherein the scheduled time for each call is such that the calls from each calling station are substantially spaced apart in time from each other,*
  *each station transmitting over the telephone network the respective phone number of its station and the date and time of the last update of the billing rate parameters,*
  *verifying in the rate provider that an update is required based on said transmitted last update information, and*
  *transmitting over the telephone network from the rate provider to the calling station the updated billing rate parameters when an update is required.*

*52. A call rating updating system comprising*
  *a call rating device, including a database that stores current updated billing rate parameters used for cost determination for a calling station,*
  *a data transfer line operatively connected to the call rating device, means for transmitting over the data transfer line indicia information identifying the call rating device and update information identifying the last update of the billing rate parameters, and*
  *a rate provider operatively connected to said data transfer line, said rate provider including*
    *(a) a database having updated billing rate parameters for a plurality of calling stations,*
    *(b) means for receiving the information from the call rating device,*
    *(c) means for verifying if billing rate parameters should be updated based on said received last update information, and*
    *(d) means transmitting from the rate provider to the call rating device the updated billing rate parameters when the rate provider determines that an update is required.*

*53. A system for updating a database having billing rate parameters for determining the cost of telephone calls originating from a calling station to a destination calling station via a telephone network, comprising*
  *a calling station operatively connected to the telephone network, and including database means associated with the calling station for storing billing rate parameters for determining the cost of the phone call, and including means for transmitting over the telephone network information identifying the phone number of the calling station and the date and time of the last update of the billing rate parameters,*
  *rate providing means operatively connected to the phone network for storing billing rate parameters for calling stations, said rate providing means including means for receiving said information from the calling station, said rate providing means including:*
    *(a) control means for determining whether the calling party database should be updated based on said received last update information; and*
    *(b) means for transmitting updated billing rate parameters to the calling party when an update is required.*

* * * * *